US012482443B2

(12) United States Patent
Matsushita

(10) Patent No.: US 12,482,443 B2
(45) Date of Patent: Nov. 25, 2025

(54) MUSIC SCORE PLATE SUPPORT STRUCTURE FOR MUSICAL INSTRUMENT

(71) Applicant: YAMAHA CORPORATION, Hamamatsu (JP)

(72) Inventor: Kazuhiro Matsushita, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 392 days.

(21) Appl. No.: 18/147,959

(22) Filed: Dec. 29, 2022

(65) Prior Publication Data

US 2023/0210257 A1 Jul. 6, 2023

(30) Foreign Application Priority Data

Jan. 5, 2022 (JP) ................................ 2022-000575

(51) Int. Cl.
*G10G 7/00* (2006.01)
*A47B 23/00* (2006.01)

(52) U.S. Cl.
CPC ............ *G10G 7/00* (2013.01); *A47B 23/004* (2013.01)

(58) Field of Classification Search
CPC .......... G10G 7/00; G10G 5/00; A47B 23/004; A47B 23/043; G10C 3/02; G10C 1/06; G10C 3/00; G10C 3/161; G10H 1/32; G10H 1/34
See application file for complete search history.

(56) References Cited

U.S. PATENT DOCUMENTS

2012/0175487 A1* 7/2012 Goto ........................ G10G 7/00 248/447

FOREIGN PATENT DOCUMENTS

| | | | | | |
|---|---|---|---|---|---|
| JP | H06237825 | A | | 8/1994 | |
| JP | 2001356771 | A | | 12/2001 | |
| JP | 2002215132 | A | * | 7/2002 | .............. G10C 3/00 |
| JP | 2005181905 | A | | 7/2005 | |
| JP | 2010145934 | A | | 7/2010 | |
| JP | 5212083 | B2 | | 6/2013 | |
| JP | 2004294789 | A | | 10/2021 | |

OTHER PUBLICATIONS

Office Action issued in CN Appln. No. 202211720007.1 mailed Jul. 19, 2025. English machine translation provided.
Office Action issued in Japanese Appln. No. 2022-000575 mailed on Oct. 14, 2025.

* cited by examiner

*Primary Examiner* — Kimberly R Lockett
(74) *Attorney, Agent, or Firm* — ROSSI, KIMMS & McDOWELL LLP

(57) ABSTRACT

A music score plate support structure for a musical instrument, includes: a music score plate; and a support mechanism portion configured to movably support the music score plate with respect to a front plate of a main body of the musical instrument. The support mechanism portion includes: a connecting portion, a first pivot portion connecting the connecting portion and the front plate of the main body to each other so as to be pivotable relative to each other, and a second pivot portion connecting the connecting portion and the music score plate to each other so as to be pivotable relative to each other.

12 Claims, 8 Drawing Sheets

MUSIC SCORE PLATE SUPPORT STRUCTURE FOR MUSICAL INSTRUMENT

CROSS-REFERENCE TO RELATED APPLICATIONS

This application is based on and claims priority under 35 USC 119 from Japanese Patent Application No. 2022-000575 filed on Jan. 5, 2022, the contents of which are incorporated herein by reference.

TECHNICAL FIELD

The present disclosure relates to a music score plate support structure for a musical instrument.

BACKGROUND ART

In the related art, as a music score plate support structure for supporting a music score, a music score plate support structure applied to a musical instrument such as a piano is known. For example, in JP2005-181905A, JPH06-237825A, and JP5212083B, a music score plate is pivoted with respect to a top plate of a main body of a musical instrument, and is erected or reclined with respect to the top plate. When the music score plate is pivoted, a front end portion of a rod-shaped member provided on the music score plate moves in a guide groove provided on the top plate and the like.

SUMMARY OF INVENTION

However, the music score plate support structures disclosed in JP2005-181905A, JPH06-237825A, and JP5212083B are all applied to a grand piano, and are not assumed to be applied to musical instruments of other forms such as upright pianos and so on.

An object of the present disclosure is to provide a music score plate support structure for a musical instrument capable of setting a music score plate in an appropriate posture at a position closer to a player than a front plate of a musical instrument.

Aspect of non-limiting embodiments of the present disclosure relates to provide a music score plate support structure for a musical instrument, including: a music score plate; and a support mechanism portion configured to movably support the music score plate with respect to a front plate of a main body of the musical instrument, in which the support mechanism portion includes: a connecting portion, a first pivot portion connecting the connecting portion and the front plate of the main body to each other so as to be pivotable relative to each other, and a second pivot portion connecting the connecting portion and the music score plate to each other so as to be pivotable relative to each other.

According to an embodiment of the present disclosure, the music score plate can be set in an appropriate posture at a position closer to a player than the front plate of the musical instrument.

DESCRIPTION OF EMBODIMENTS

Hereinafter, embodiments of the present disclosure will be described in detail with reference to the drawings.

Figure 1:
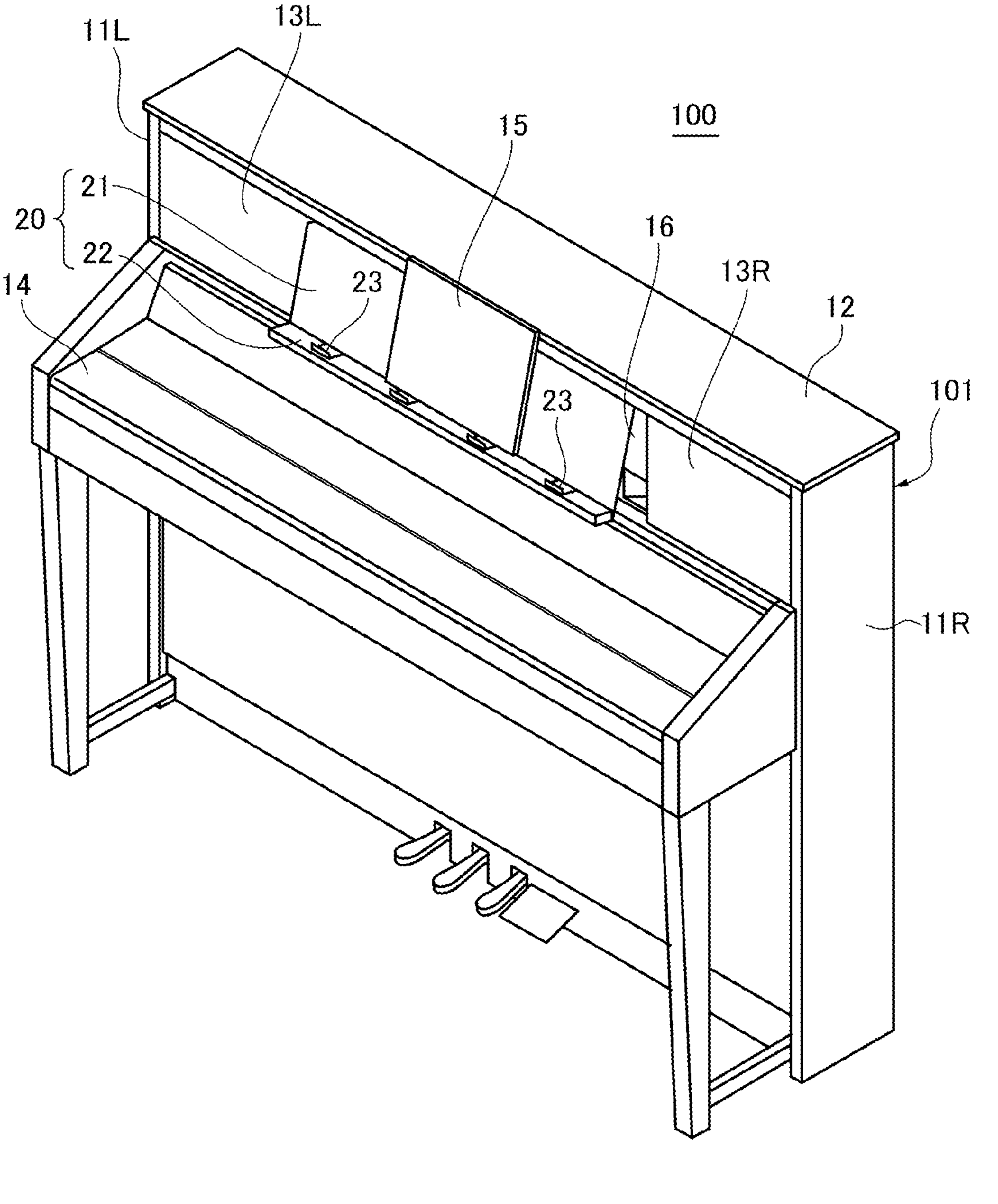
FIG. 1 is a perspective view of a musical instrument to which a music score plate support structure is applied.

FIG. 1 is a perspective view of a musical instrument to which a music score plate support structure according to an embodiment of the present disclosure is applied. A musical instrument 100 is an upright type musical instrument, and is, for example, an electronic upright piano. The musical instrument 100 includes a main body 101 and a fallboard 14 which covers a keyboard portion (not shown). Hereinafter, with respect to a left-right direction of the musical instrument 100, a direction viewed from a player is used as a reference, and with respect to a front-rear direction, the player side is used as a front side.

The main body 101 includes a top plate 12, a front plate 16, a left side plate 11L, a right side plate 11R, a left decorative plate 13L, and a right decorative plate 13R. The top plate 12 is provided so as to extend from an upper end of the left side plate 11L to an upper end of the right side plate 11R. The front plate 16 is disposed between a front portion of the left side plate 11L and a front portion of the right side plate 11R. In addition, a music score plate 20 is provided so as to be movable with respect to the main body 101. A music score, an electronic pad, and the like can be supported on the music score plate 20. Hereinafter, the music score, the electronic pad, and the like supported by the music score plate 20 are collectively referred to as a music score and the like 15. In FIG. 1, an electronic pad is shown as the music score and the like 15 to be supported. The music score plate 20 includes a back plate 21, a music score receiver 22, and a plurality of music score pressers 23. The music score receiver 22 supports a lower end of the music score and the like 15, and the back plate 21 supports a back surface of the music score and the like 15.

Figure 2:
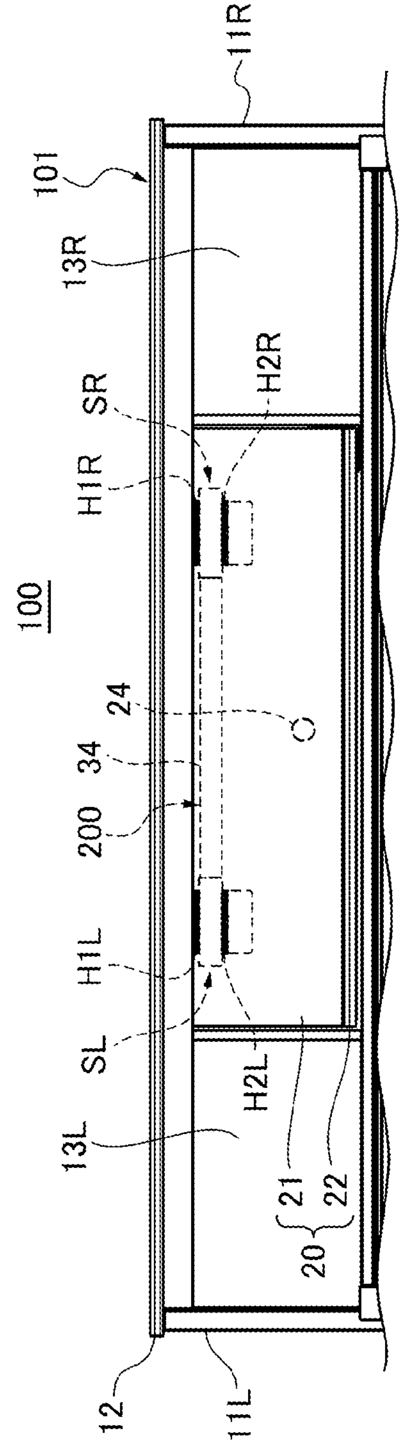
FIG. 2 is a front view of an upper part of the musical instrument.
Figure 3:
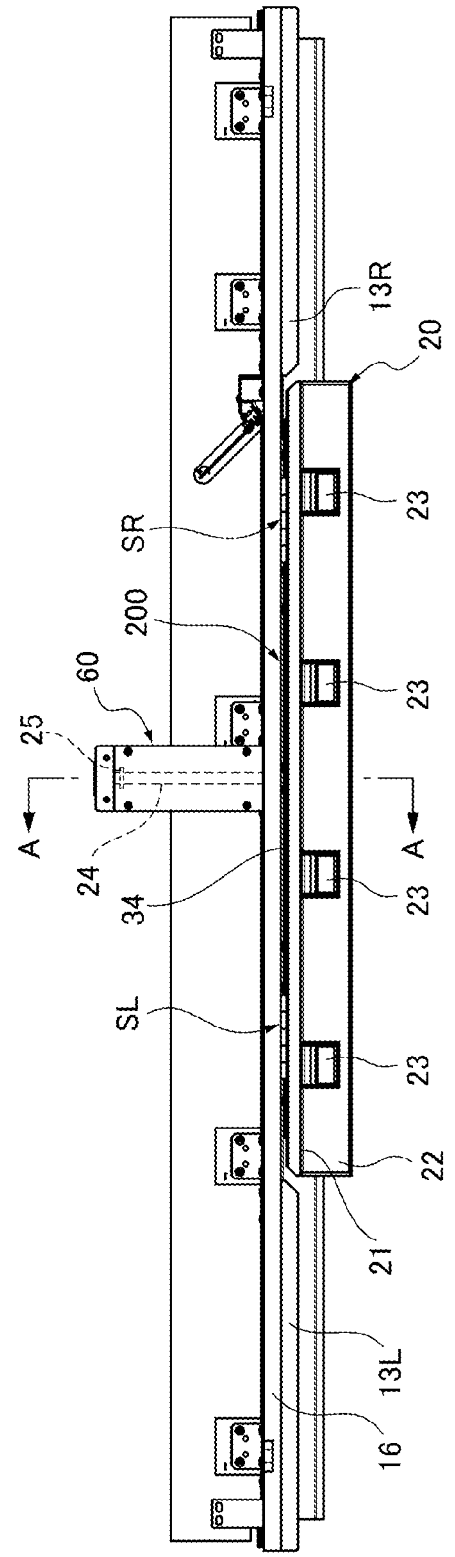
FIG. 3 is a top view showing a music score plate of the musical instrument and a peripheral configuration of the music score plate.

FIG. 2 is a front view of an upper part of the musical instrument 100. FIG. 3 is a top view showing the music score plate 20 and a peripheral configuration thereof. In FIG. 3, in addition to the front plate 16, the music score plate 20, and the decorative plates 13L and 13R, a guide portion 60 and the like are illustrated. The decorative plate 13L and the decorative plate 13R are fixed to a front surface of the front plate 16 by adhesion and the like. The music score plate 20 is located between the decorative plate 13L and the decorative plate 13R in the left-right direction.

The player can raise the music score pressers 23 or tilt the music score pressers 23 backward. By raising the music score pressers 23, the lower end of the music score and the like 15 placed on the music score receiver 22 can be held so as not to be displaced forward. In addition, the musical instrument 100 includes a mechanism 200 for supporting the music score plate 20 on the front plate 16.

Figure 4:
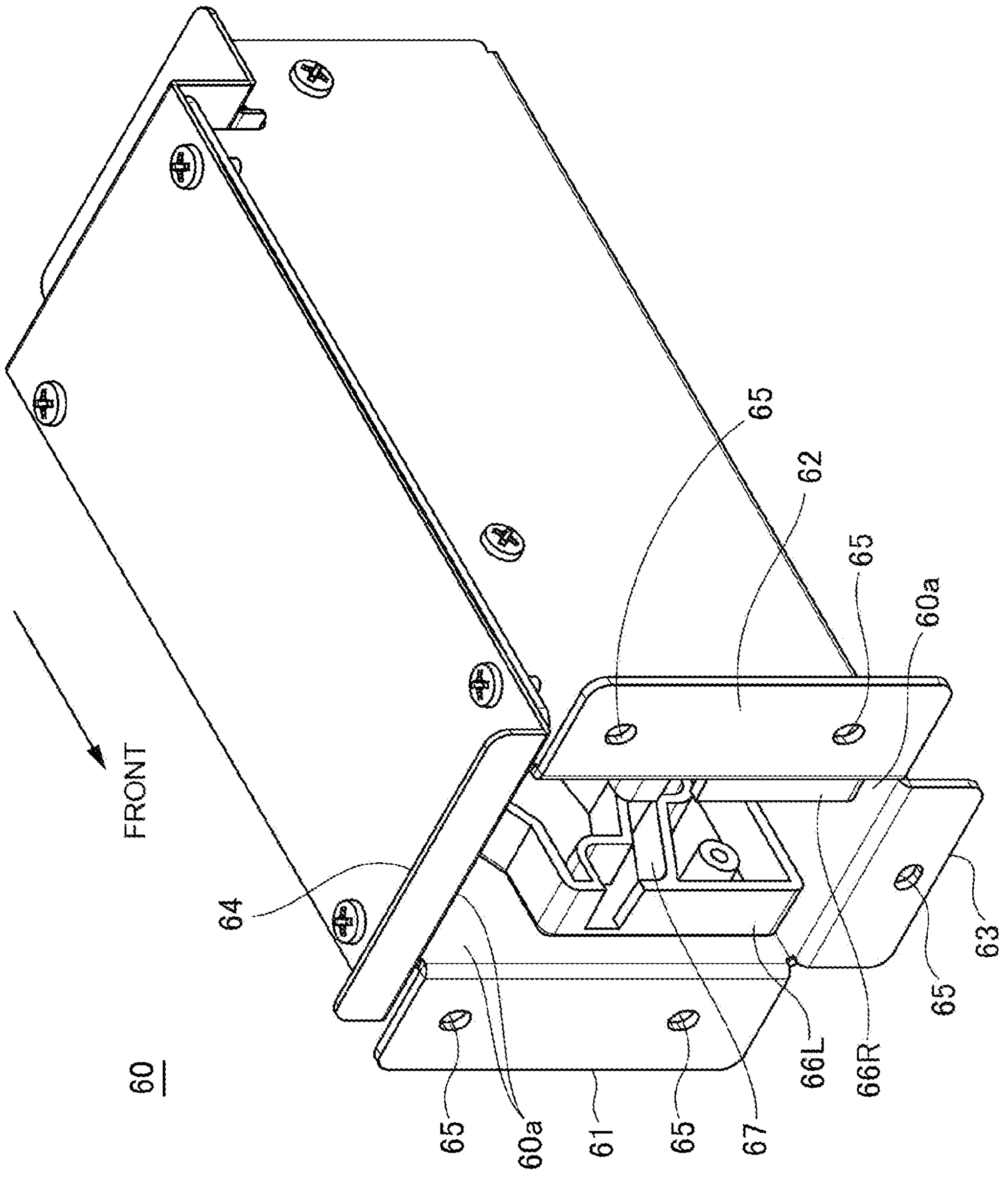
FIG. 4 is a perspective view of a guide portion of the musical instrument.
Figure 5:
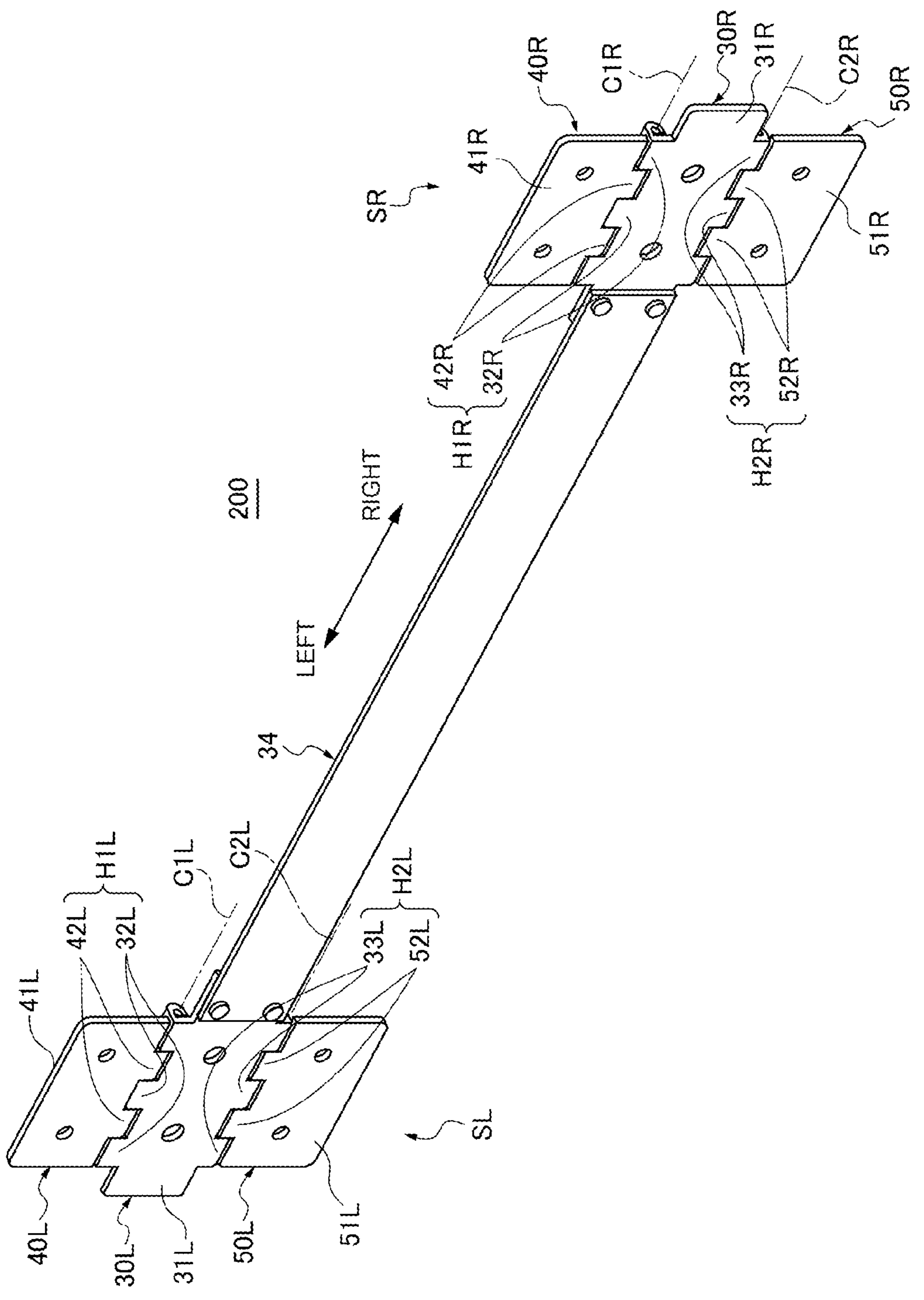
FIG. 5 is a perspective view of a mechanism for supporting the music score plate on a front plate of the musical instrument.
Figure 6:
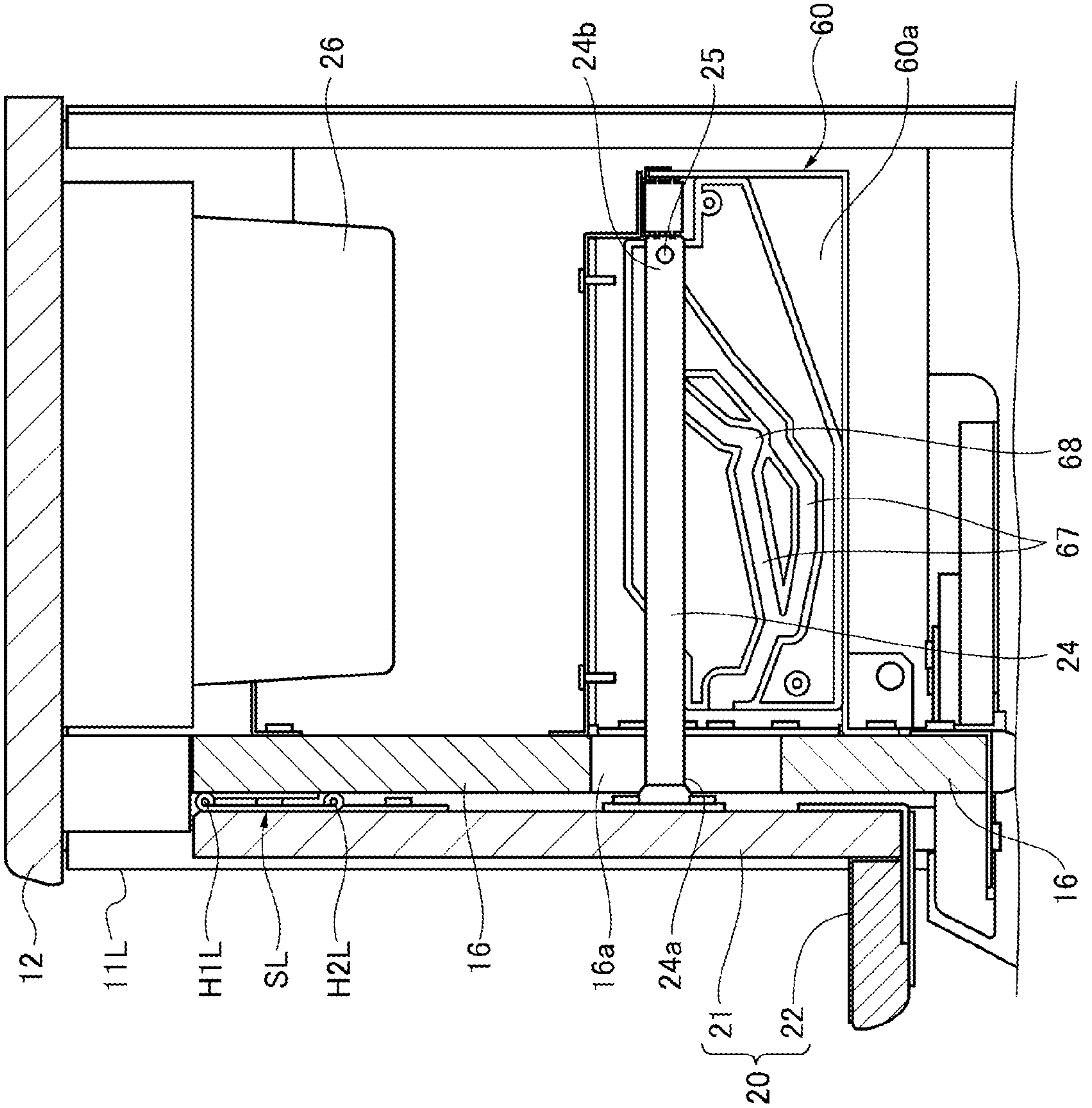
FIG. 6 is a partial cross-sectional view of the musical instrument in which the music score plate is located in a housing position taken along a line A-A of FIG. 3.
Figure 7:
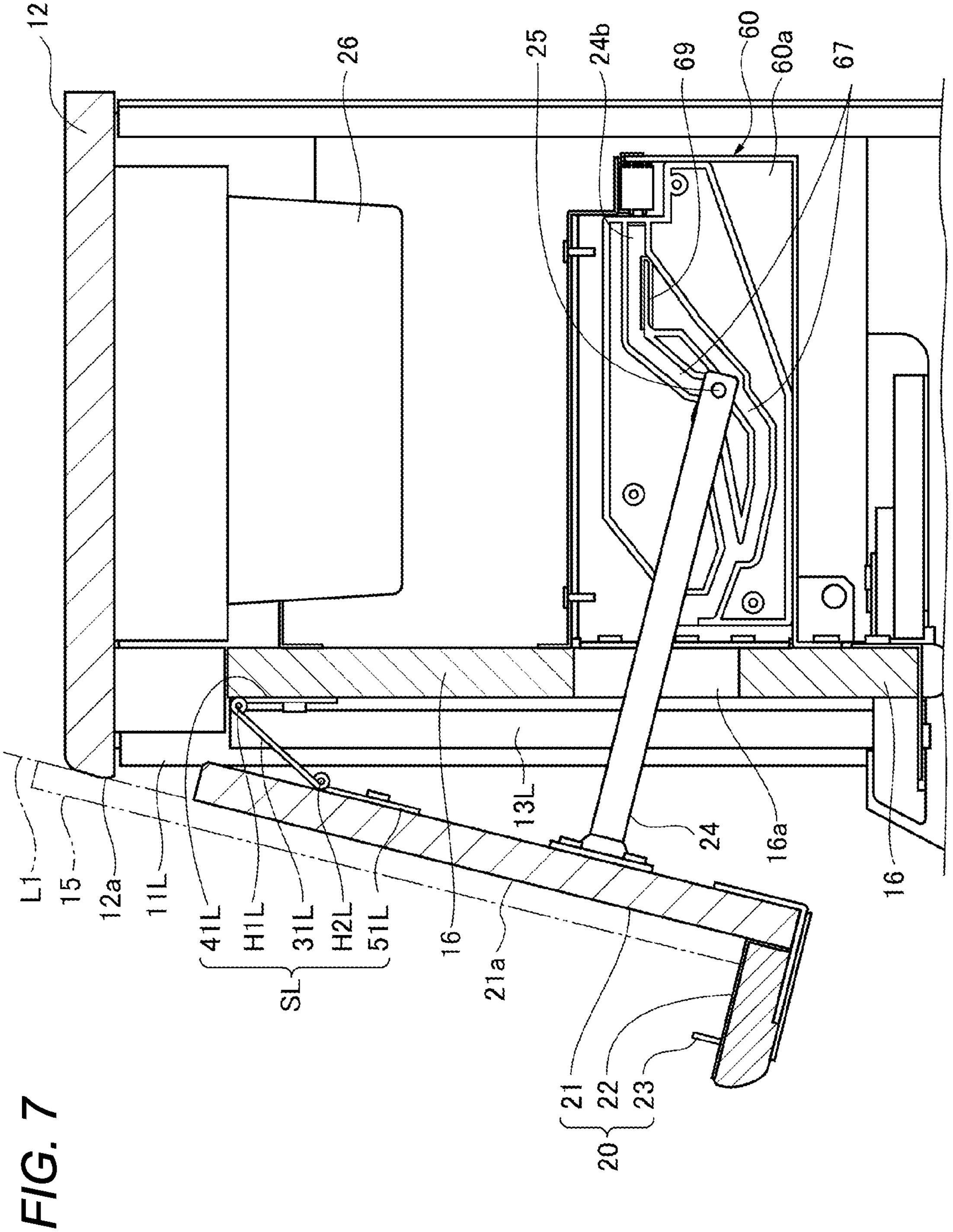
FIG. 7 is a partial cross-sectional view of the musical instrument in which the music score plate is located in a main use position taken along the line A-A of FIG. 3.
Figure 8:
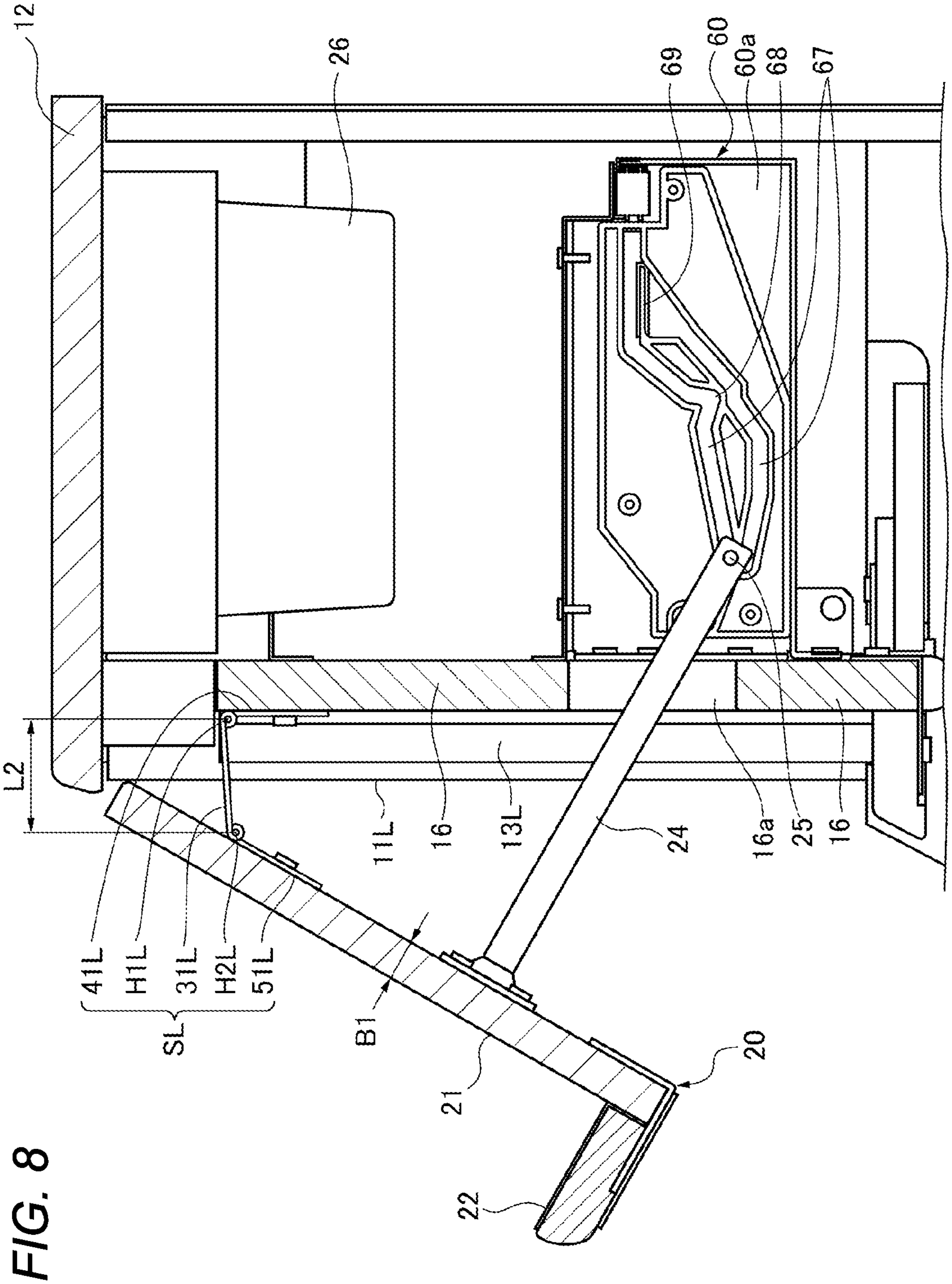
FIG. 8 is a partial cross-sectional view of the musical instrument in which the music score plate is located in a most front position taken along the line A-A of FIG. 3.

FIG. 4 is a perspective view of the guide portion 60. FIG. 5 is a perspective view of the mechanism 200. FIGS. 6 to 8 are partial cross-sectional views of the musical instrument 100 in which the music score plate 20 is located in the housing position, the main use position, and the most front position taken along a line A-A of FIG. 3.

As illustrated in FIG. 4, the guide portion 60 is formed in a box shape having a hollow portion 60*a*, and is fixed to the front plate 16. The guide portion 60 includes flange portions 61, 62, 63, and 64, and fastening holes 65 are formed in the flange portions 61, 62, 63, and 64. As illustrated in FIGS. 6 to 8, a hole 16*a* corresponding to the hollow portion 60*a* is formed in the front plate 16. The flange portions 61 to 64 are fastened to the back surface of the front plate 16 by screws via the fastening holes 65 in a state where the flange portions 61 to 64 abut against the back surface of the front plate 16 such that the hollow portion 60*a* and the hole 16*a* coincide with each other. Thus, the guide portion 60 is fixed to the front plate 16 in a state where the hollow portion 60*a* and the hole 16*a* are communicated to each other.

A pair of groove members 66L and 66R are provided in the hollow portion 60*a*. A pair of guide grooves 67 are formed in the groove members 66L and 66R respectively (only the guide groove 67 of the groove member 66L is illustrated in FIG. 4) (see also FIGS. 6 to 8). The guide groove 67 of the groove member 66L and the guide groove 67 of the groove member 66R are symmetrical and face each other.

As illustrated in FIGS. 6 to 8, a support rod 24 is fixed to a position close to a lower portion of the back plate 21 of the music score plate 20. One end 24*a* of the support rod 24 is fixed to a back surface of the back plate 21 of the music score plate 20 with a screw, and the other end 24*b* of the support rod 24 is inserted into the hollow portion 60*a* of the guide portion 60 through the hole 16*a*. A pin 25 protruding in the left-right direction is fixed to the other end 24*b* of the support rod 24 (see also FIG. 3). Left and right ends of the pin 25 are disposed so as to be engaged with the guide grooves 67 of the groove members 66L and 66R. A speaker 26 is disposed below the top plate 12.

As illustrated in FIG. 5, the mechanism 200 includes a left support mechanism portion SL, a right support mechanism portion SR, and a bridge portion 34 connecting the support mechanism portion SL and the support mechanism portion SR. By the mechanism 200, the music score plate 20 can be moved with respect to the front plate 16 at least to a housing position (first position) which is an initial position and a main use position (second position) where the music score plate 20 is mainly used for placing the music score. In FIGS. 2, 3, and 6, the music score plate 20 is located in the housing position, and in FIGS. 1 and 7, the music score plate 20 is located in the main use position.

The support mechanism portion SL is configured as follows. The support mechanism portion SL includes a front plate attachment portion 40L, a connecting fitting 30L, and a music score plate attachment portion 50L. Each of these members is a plate-like member made of metal. The front plate attachment portion 40L includes an attachment piece 41L and a front plate side pivot shaft portion 42L. The connecting fitting 30L includes a connecting piece 31L (connecting portion), a front plate side bearing portion 32L, and a music score plate side bearing portion 33L. The music score plate attachment portion 50L includes an attachment piece 51L and a music score plate side pivot shaft portion 52L.

A first pivot portion H1L is configured by connecting the front plate side pivot shaft portion 42L and the front plate side bearing portion 32L so as to form a hinge structure. Therefore, the attachment piece 41L and the connecting piece 31L are relatively pivotable about a pivot center C1L of the first pivot portion H1L.

A second pivot portion H2L is configured by connecting the music score plate side pivot shaft portion 52L and the music score plate side bearing portion 33L so as to form a hinge structure. Therefore, the attachment piece 51L and the connecting piece 31L are relatively pivotable about a pivot center C2L of the second pivot portion H2L.

The support mechanism portion SR is formed symmetrically with respect to the support mechanism portion SL. Therefore, a front plate attachment portion 40R, an attachment piece 41R, a front plate side pivot shaft portion 42R, a music score plate attachment portion 50R, an attachment piece 51R, and a music score plate side pivot shaft portion 52R are configured similarly to the front plate attachment portion 40L, the attachment piece 41L, the front plate side pivot shaft portion 42L, the music score plate attachment portion 50L, the attachment piece 51L, and the music score plate side pivot shaft portion 52L, respectively. In addition, a connecting fitting 30R, a connecting piece 31R (connecting portion), a front plate side bearing portion 32R, and a music score plate side bearing portion 33R are configured similarly to the connecting fitting 30L, the connecting piece 31L, the front plate side bearing portion 32L, and the music score plate side bearing portion 33L, respectively.

In the support mechanism portion SR, a first pivot portion H1R is configured by the front plate side pivot shaft portion 42R and the front plate side bearing portion 32R. Therefore, the attachment piece 41R and the connecting piece 31R are relatively pivotable about a pivot center C1R of the first pivot portion H1R. In addition, a second pivot portion H2R is configured by the music score plate side pivot shaft portion 52R and the music score plate side bearing portion 33R. The attachment piece 51R and the connecting piece 31R are relatively pivotable about a pivot center C2R of the second pivot portion H2R.

The connecting piece 31L and the connecting piece 31R are fixed to left and right end portions of the bridge portion 34. The connecting piece 31L and the connecting piece 31R are parallel to each other. Therefore, the pivot center C1L and the pivot center C1R are on the same straight line, and the pivot center C2L and the pivot center C2R are on the same straight line. The pivot centers C1L and C1R and the pivot centers C2L and C2R are parallel to each other. A relationship between a pivot shaft portion and a bearing portion forming each pivot portion may be reversed from that exemplified above.

The support mechanism portions SL and SR cooperate with each other to movably support the music score plate 20 with respect to the front plate 16. The support mechanism portion SL and the support mechanism portion SR are attached to the music score plate 20 and the front plate 16 in the same manner.

As illustrated in FIGS. 7 and 8, the attachment piece 41L is fixed to the front surface of the front plate 16 with a screw. Similarly, the attachment piece 41R is also fixed to the front surface of the front plate 16 with a screw. Therefore, the first pivot portions H1L and H1R connect the connecting pieces 31L and 31R and the front plate 16 so as to be pivotable relative to each other. In addition, the attachment piece 51L is fixed to the back surface of the back plate 21 of the music score plate 20 by a screw. Similarly, the attachment piece 51R is also fixed to the back surface of the back plate 21 with a screw. Therefore, the second pivot portions H2L and H2R connect the connecting pieces 31L and 31R and the music score plate 20 so as to be pivotable relative to each other. By the relative pivot of the connecting pieces 31L and 31R with respect to the front plate 16 and the music score plate 20, the music score plate 20 can be moved to a plurality of positions including the housing position and the main use position, and the posture of the music score plate 20 can be changed.

As illustrated in FIG. 8 and the like, the guide groove 67 is configured to form a closed loop. An elastic piece 69 is provided at a rear portion of the guide groove 67. The elastic piece 69 allows the pin 25 of the support rod 24 to pass only in an upward direction. Therefore, the pin 25 moves in a counterclockwise direction in FIG. 8 through the closed loop formed by the guide groove 67. A hook portion 68 that is recessed downward is provided in the middle of a groove portion of an upper path in the guide groove 67.

A movement process of the music score plate 20 will be described.

First, at the housing position of the music score plate 20 (FIG. 6), the pin 25 is located at a rearmost portion of the guide groove 67. The pivot centers C1L and C1R of the first pivot portions H1L and H1R and the pivot centers C2L and C2R of the second pivot portions H2L and H2R are arranged in an upper-lower direction. The back plate 21 of the music score plate 20 is parallel to the upper-lower direction (vertical direction), and the back surface of the back plate 21 of the music score plate 20 is parallel to the front surface of the front plate 16. The back plate 21 is arranged between the decorative plate 13L and the decorative plate 13R in the left-right direction. The back surface of the back plate 21 faces the front surface of the front plate 16 from a front side. A front surface 21*a* of the back plate 21 does not protrude forward with respect to the left and right side plates 11L and 11R.

When the player pulls the music score plate 20 forward from the housing position while holding a lower portion and the like of the music score plate 20, the music score plate 20 moves forward by the pivot of the first pivot portions H1L and H1R and the pivot of the second pivot portions H2L and H2R. At this time, the pin 25 moves in the upper path of the guide groove 67 (a path from the rearmost portion of the guide groove 67 toward the front plate 16 via an upper side of the elastic piece 69), and the posture of the music score plate 20 changes depending on the position of the pin 25.

When the pin 25 reaches the vicinity of the hook portion 68, the pin 25 falls into the hook portion 68 by a weight of the music score plate 20 and stops in the hook portion 68. As illustrated in FIG. 7, when the pin 25 is hooked on the hook portion 68, the movement of the music score plate 20 is restricted at the main use position. Therefore, even if a hand is released from the music score plate 20, the posture of the music score plate 20 does not change and is stable.

When the player further pulls the music score plate 20 from the main use position while holding the lower portion of the music score plate 20 and the like, the music score plate 20 further moves forward with the pivot. As illustrated in FIG. 8, when the pin 25 reaches the foremost portion of the guide groove 67, the music score plate 20 cannot move further forward. From this state, when the player weakens a force of pulling the music score plate 20 forward or releases the hand from the music score plate 20, the music score plate 20 moves backward with the pivot due to its own weight. At this time, the pin 25 moves a lower path of the guide groove 67 (a path from the foremost portion of the guide groove 67 toward a lower side of the elastic piece 69). Eventually, the pin 25 passes through the elastic piece 69 upward, reaches the rearmost portion of the guide groove 67, and the music score plate 20 returns to the housing position (FIG. 6).

In the main use position (FIG. 7), not only the lower portion of the music score plate 20 but also the upper portion of the music score plate 20 protrudes forward from the decorative plates 13L and 13R. Therefore, the back plate 21 is closer to the player as a whole than the back plate 21 in the housing position. In the main use position, the pivot centers C2L and C2R of the second pivot portions H2L and H2R are located on the front side in the front-rear direction with respect to the pivot centers C1L and C1R of the first pivot portions H1L and H1R. If an upper portion of the music score plate 20 is connected to the front plate 16 by a single pivot portion, the lower portion of the music score plate 20 simply pivots forward, and a position of an upper portion of the back plate 21 does not change so much and does not come close to the player. In the present embodiment, since the music score plate 20 is close to the player at the main use position, the music score and the like 15 can be easily seen by the player.

As illustrated in FIG. 8, by making a maximum distance L2 between the pivot centers C1L and C1R of the first pivot portions H1L and H1R and the pivot centers C2L and C2R of the second pivot portions H2L and H2R longer than a thickness B1 of the music score plate 20, it is easy to ensure a sufficient amount of protrusion of the music score plate 20.

In addition, in the main use position (in a cross-sectional view cut in the front-rear direction of the main body 101 of the musical instrument 100 as shown, for example, in FIG. 7), a front end 12*a* of the top plate 12 is set to coincide with or not to protrude from an extension line (virtual line) L1 of the front surface 21*a* of the back plate 21 of the music score plate 20, when the cross-sectional view is viewed from the left or right side of the main body 101 of the musical instrument 100. Therefore, even if the music score and the like 15 put on the music score plate 20 is long in the upper-lower direction, the top plate 12 does not interfere with the music score and the like 15, and the music score and the like 15 can be stably held by the music score plate 20.

In addition, at the main use position, a lower end of the music score plate 20 protrudes forward more than an upper end of the music score plate 20, and the music score and the like 15 can be placed at an appropriate angle. As described above, in order to hold the music score plate 20 at an appropriate angle in the main use position, it is desirable that the support mechanism portions SL and SR connect a position closer to the upper end than the lower end of the front plate 16 and a position closer to the upper end than the lower end of the music score plate 20.

According to the present embodiment, the support mechanism portions SL and SR movably support the music score plate 20 with respect to the front plate 16 of the main body 101. In the support mechanism portions SL and SR, the first pivot portions H1L and H1R connect the connecting pieces 31L and 31R and the front plate 16 so as to be pivotable relative to each other, and the second pivot portions H2L and H2R connect the connecting pieces 31L and 31R and the music score plate 20 so as to be pivotable relative to each other. Since the music score plate 20 and the front plate 16 are connected to each other via two pivot portions, that is, the first pivot portion on the front plate 16 side and the second pivot portion on the music score plate 20 side, the music score plate 20 can be brought into an appropriate posture at a position closer to the player than the front plate 16.

In addition, when the pin 25 is hooked on the hook portion 68 in the guide groove 67, the music score plate 20 stops at the main use position. That is, since the hook portion 68 serves as a movement restricting portion that restricts the movement of the music score plate 20 at the main use position, the music score plate 20 can be stably maintained in an appropriate posture when the music score plate 20 is used at the main use position.

In addition, at the housing position (FIG. 6), the pivot centers C1L and C1R of the first pivot portions H1L and H1R and the pivot centers C2L and C2R of the second pivot portions H2L and H2R are arranged in the upper-lower direction, so that the back plate 21 of the music score plate 20 can be arranged between the decorative plates 13L and 13R. On the other hand, in the main use position, the pivot centers C2L and C2R of the second pivot portions H2L and H2R are located on the front side in the front-rear direction with respect to the pivot centers C1L and C1R of the first pivot portions H1L and H1R. Therefore, when the music score plate 20 is used, it is possible to make the music score plate 20 largely protrude forward to bring the music score and the like 15 close to the player.

In addition, in the main use position (FIG. 7), the front end 12*a* of the top plate 12 coincides with or does not protrude from the extension line L1 of the front surface 21*a* of the back plate 21 of the music score plate 20 when the cross-sectional view is viewed from the left or right side of the main body 101 of the musical instrument 100. Therefore, even if the music score and the like 15 put on the music score plate 20 is long in the upper-lower direction, the music score and the like 15 can be stably held.

In addition, since the pin 25 of the support rod 24 is engaged with the guide groove 67, it is possible to smoothly change the posture of the music score plate 20. In addition, one set of the guide portion 60 and the support rod 24 is provided at a center of the main body 101 in the left-right direction (FIG. 3). Accordingly, it is possible to smoothly change the posture of the music score plate 20.

Although the present disclosure has been described in detail based on the preferred embodiments thereof, the present disclosure is not limited to these specific embodiments, and various embodiments within the scope not departing from the gist of the present disclosure are also included in the present disclosure. For example, the following modifications may be adopted.

First, the first pivot portions H1L and H1R and the second pivot portions H2L and H2R are respectively fixed to the front plate 16 and the music score plate 20 via the attachment pieces 41L and 41R, but these pivot portions may be directly fixed to the front plate 16 and the music score plate 20. In this case, the pivot portions H1L, H1R, H2L, and H2R and the connecting pieces 31L and 31R form the support mechanism portions SL and SR.

Each of the support mechanism portions SL and SR has two pivot portions, that is, the pivot portion on the front plate 16 side and the pivot portion on the music score plate 20 side, and may have three or more pivot portions. That is, the front plate 16 and the music score plate 20 may be connected to each other via three or more pivot portions. For example, taking the connecting piece 31L as an example, a portion corresponding to the connecting piece 31L may be formed by connecting two pieces by a third pivot portion. Accordingly, even in a state where the pin 25 is hooked on the hook portion 68, the posture (inclination angle) of the music score plate 20 can be variously selected. In this configuration, in order to ensure a sufficient amount of forward protrusion of the music score plate 20 at the main use position, the maximum distance L2 between the pivot center of the pivot portion on the front plate 16 side and the pivot center of the pivot portion on the music score plate 20 side may be set to be longer than the thickness B1 of the music score plate 20.

The pivot portions H1L, H1R, H2L, and H2R may respectively include a torque hinge portion. That is, each pivot portion may have a torque hinge function of generating a drag against a force for relatively pivoting the connecting pieces 31L and 31R with respect to the front plate 16 or the music score plate 20. In particular, when a magnitude of the drag is appropriately set, the movement of the music score plate 20 can be restricted at any position and posture, and the position where the stop of the music score plate 20 is maintained can be set as a use position where the music score plate 20 is used for placing the music score. That is, even in a state where the pin 25 is not located on the hook portion 68, the music score and the like 15 can be placed on the music score plate 20 and used.

Further, when the magnitude of the drag is increased and appropriately set, the music score plate 20 can be maintained at any position and posture without providing the guide portion 60 and the support rod 24, and the position and posture of the music score plate 20 can be selected more variously. In this viewpoint, the torque hinge portion serves as the movement restricting portion that restricts the movement of the music score plate 20 at the use position.

As another example of the movement restricting portion in the case where the torque hinge portion is not provided, for example, instead of the hook portion 68, a support column capable of performing a standing operation may be provided on the front plate 16 or the music score plate 20, and the music score plate 20 may be supported by the support column with respect to the front plate 16.

In the present embodiment, the two support mechanism portions SL and SR are provided, and one support mechanism portion or three or more support mechanism portions may be provided.

The musical instrument 100 to which the present disclosure is applied is not limited to a piano or a keyboard musical instrument. In addition, the present disclosure is not limited to an electronic musical instrument.

What is claimed is:

1. A music score plate support structure for a musical instrument, comprising:

a music score plate; and a support mechanism portion configured to movably support the music score plate with respect to a front plate of a main body of the musical instrument, wherein the support mechanism portion comprises:

a connecting portion, a first pivot portion connecting the connecting portion and the front plate of the main body to each other so as to be pivotable relative to each other about a pivot center of the first pivot portion, and a second pivot portion connecting the connecting portion and the music score plate to each other so as to be pivotable relative to each other about a pivot center of the second pivot portion, the pivot center of the second pivot portion being spaced apart from the pivot center of the first pivot portion.

2. The music score plate support structure according to claim 1, further comprising a movement restricting portion, wherein the music score plate is movable to a first position, as an initial position, and a second position, at which the music score plate is used for holding a music score, by a relative pivot of the connecting portion with respect to the front plate of the main body and the music score plate, and the movement restricting portion is configured to restrict a movement of the music score plate in a state that the music score plate is located at the second position.

3. The music score plate support structure according to claim 2, wherein the pivot center of the first pivot portion and the pivot center of the second pivot portion are arranged, with respect to each other, in an upper-lower direction of the main body of the musical instrument in a state that the music score plate is located at the first position, and the pivot center of the second pivot portion is located on a front side, in a front-rear direction of the main body, with respect to the pivot center of the first pivot portion in the state that the music score plate is located at the second position.

4. The music score plate support structure according to claim 2, wherein in a cross-sectional view cut in a front-rear direction of the main body of the musical instrument, a front end of a top plate of the main body of the musical instrument does not protrude beyond a virtual line extending from a front surface of the music score plate, in the state that the music score plate is located at the second position, when the cross-sectional view is viewed from a left side of the main body of the musical instrument or from a right side of the main body of the musical instrument.

5. The music score plate support structure according to claim 1, further comprising:

a guide portion having a guide groove and being fixed to the main body of the musical instrument; and a support rod having a first end fixed to the music score plate and a second end engaged with the guide groove.

6. The music score plate support structure according to claim 2, wherein the movement restricting portion comprises:

a guide portion having a guide groove and being fixed to the main body of the musical instrument, and a support rod having a first end fixed to the music score plate and a second end engaged with the guide groove, a hook portion is disposed in the guide groove, and the movement of the music score plate is restricted in the state that the music score plate is located at the second position by the second end of the support rod being disposed at the hook portion.

7. The music score plate support structure according to claim 5, wherein the music score plate support structure has a single guide portion and a single support rod, and the single guide portion and the single support rod are disposed at a center of the main body of the musical instrument in a left-right direction of the main body of the musical instrument.

8. The music score plate support structure according to claim 1, wherein a maximum distance between the pivot center of the first pivot portion and the pivot center of the second pivot portion exceeds a thickness of the music score plate.

9. A music score plate support structure for a musical instrument, comprising:

a music score plate; and a support mechanism portion configured to movably support the music score plate with respect to a front plate of a main body of the musical instrument, wherein the support mechanism portion comprises:

a connecting portion, a first pivot portion connecting the connecting portion and the front plate of the main body to each other so as to be pivotable relative to each other, and a second pivot portion connecting the connecting portion and the music score plate to each other so as to be pivotable relative to each other, and wherein the support mechanism portion is connected to a part of the front plate of the main body that is closer to an upper end of the front plate than a lower end of the front plate and is connected to a part of the music score plate that is closer to an upper end of the music score plate than a lower end of the music score plate.

10. The music score plate support structure according to claim 1, wherein each of the first pivot portion and the second pivot portion includes a torque hinge portion.

11. The music score plate support structure according to claim 1, wherein each of the first pivot portion and the second pivot portion includes a torque hinge portion, the music score plate is movable to a first position, as an initial position, and a second position, at which the music score plate is used for holding a music score, by a relative pivot of the connecting portion with respect to the front plate of the main body and the music score plate, and movement of the music score plate is restricted in the state that the music score plate is located at the second position by the first pivot portion and the second pivot portion generating a drag against a force for relatively pivoting the connecting portion with respect to the front plate of the main body and the music score plate.

12. A musical instrument comprising:

the music score plate support structure according to claim 1.

* * * * *